US009235351B2

(12) United States Patent
Jeong et al.

(10) Patent No.: US 9,235,351 B2
(45) Date of Patent: Jan. 12, 2016

(54) SELECTIVE INTERFACING APPARATUS AND METHOD (75) Inventors: Soon-gyu Jeong, Suwon-si (KR); Dong-hwan Lim, Yongin-si (KR); Hyung-kyoon Kim, Suwon-si (KR); Dong-jin Lee, Seongnam-si (KR); Chang-heon Kim, Suwon-si (KR); Won Kim, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 251 days.

(21) Appl. No.: 12/822,969

(22) Filed: Jun. 24, 2010

(65) Prior Publication Data
US 2010/0329089 A1 Dec. 30, 2010

(30) Foreign Application Priority Data

Jun. 26, 2009 (KR) .................. 10-2009-0057724
Nov. 3, 2009 (KR) .................. 10-2009-0105493

(51) Int. Cl.
*G11B 20/10* (2006.01)
*G06F 3/06* (2006.01)
*G11B 27/32* (2006.01)

(52) U.S. Cl.
CPC ............ *G06F 3/0643* (2013.01); *G06F 3/0607* (2013.01); *G06F 3/0661* (2013.01); *G06F 3/0677* (2013.01); *G11B 27/329* (2013.01); *G11B 2220/2562* (2013.01)

(58) Field of Classification Search
CPC ... G06F 3/0607; G06F 3/0643; G06F 3/0677; G06F 3/0661; G11B 27/329; G11B 2220/2562
USPC ................... 369/47.15, 47.27, 59.25
See application file for complete search history.

(56) References Cited

U.S. PATENT DOCUMENTS

| 5,471,606 | A | * | 11/1995 | Huang | G06F 17/30569 369/275.1 |
| 6,741,530 | B2 | * | 5/2004 | Turner | G11B 7/08505 369/30.24 |
| 7,496,493 | B1 | * | 2/2009 | Stevens | G06F 3/0625 703/24 |
| 2003/0179679 | A1 | * | 9/2003 | Morishima | B41J 3/4071 369/108 |
| 2004/0260984 | A1 | * | 12/2004 | Lee | G11B 19/04 714/48 |
| 2005/0226104 | A1 | * | 10/2005 | Nishida | G06F 3/0613 369/30.1 |

(Continued)

FOREIGN PATENT DOCUMENTS

KR 10-2005-0118731 12/2005

OTHER PUBLICATIONS

Korean Office Action issued Sep. 12, 2012 in counterpart Korean Patent Application No. 10-2009-0057724 (4 pages, in Korean).

(Continued)

*Primary Examiner* — Thomas Alunkal
(74) *Attorney, Agent, or Firm* — NSIP Law (57) ABSTRACT

An optical disc drive, and a method of driving the optical disc drive are provided. Where the optical disc drive has a connectivity or a compatibility with a host that is incompatible with the optical disc drive, a file system and device information accepted by the host are provided. The host may have a compatibility with limited external medium devices and a specific command set for data exchange. The optical disc drive and the method of driving the optical disc drive may transmit compatible information to the host and select the specific command set accepted by the host, so that the optical disc drive is compatible with the host.

25 Claims, 8 Drawing Sheets

(56) References Cited

U.S. PATENT DOCUMENTS

| | | | |
|---|---|---|---|
| 2006/0087957 A1* | 4/2006 | Kelly | G06F 3/0607 369/275.1 |
| 2006/0174049 A1* | 8/2006 | Lin | G06F 3/0607 710/308 |
| 2007/0112891 A1* | 5/2007 | Marriott | G06F 17/30076 |
| 2007/0130604 A1* | 6/2007 | Han | H04N 21/4263 725/131 |
| 2008/0098023 A1* | 4/2008 | Araki | G06F 17/30233 |
| 2009/0003172 A1* | 1/2009 | Yahata | G11B 19/125 369/53.41 |
| 2009/0003178 A1* | 1/2009 | Nakamura | G11B 20/00086 369/100 |
| 2009/0122677 A1* | 5/2009 | Park | G11B 7/00736 369/53.17 |
| 2010/0020654 A1* | 1/2010 | Tsai | G11B 19/044 369/47.15 |

OTHER PUBLICATIONS

Korean Office Action issued Oct. 13, 2012 in counterpart Korean Patent Application No. 10-2009-0105493 (5 pages, in Korean).

* cited by examiner

SELECTIVE INTERFACING APPARATUS AND METHOD

CROSS-REFERENCE TO RELATED PATENT APPLICATION(S)

This application claims the benefit of Korean Patent Application No. 10-2009-0057724 filed on Jun. 26, 2009, and Korean Patent Application No. 10-2009-0105493, filed on Nov. 3, 2009, in the Korean Intellectual Property Office, the entire disclosure of each of which is incorporated herein by reference for all purposes.

BACKGROUND

1. Field

The following description relates to an optical disc drive having a compatibility with an audio/video (A/V) host and a method of driving the optical disc drive.

2. Description of the Related Art

Optical disc drives, which are one of optical medium devices, may store and reproduce information. Formats of optical disc drives may include compact discs (CDs) and digital versatile discs (DVDs) and may further include blue-ray discs (BDs). Recently, most optical medium devices may secure a compatibility with CDs and DVDs. Even optical medium devices having a compatibility with BDs are popularized.

Further, information display devices may include general-purpose devices such as computers, for example. Other information display devices may include TV receiver sets, which receive broadcasting via a terrestrial wave, a coaxial cable, the Internet, and the like. The TV receiver sets may be general-purpose image display devices capable of receiving various types of information in real-time. The TV receiver sets recently may include a function allowing access to peripheral devices and displaying various types of contents stored in the peripheral devices.

Audio/video (A/V) hosts including the TV receiver sets allow only a limited connectivity, and thus lack compatibility with various types of media. Furthermore, A/V devices may have a universal serial bus (USB) host function to reproduce multimedia content stored in USB storage devices (a USB memory, an MP3 player, a portable HDD, etc.) that are currently connected to the A/V devices. However, since A/V devices support only a file allocation table (FAT) file system defined by the International Standard Organization (ISO) 9293, the A/V devices are unable to reproduce data of optical discs that use a compact disc file system (CDFS) or a universal disc format (UDF) file system.

SUMMARY

In one general aspect, there is provided an optical disc drive including an information processor configured to process information related to an optical medium and an interface configured to connect the information processor to an external host. The interface includes a converting unit configured to convert information of a file system of an intrinsic format of the optical medium into information of a file system allowed by the host.

The converting unit may further include a buffer memory configured to temporarily store file information of the optical medium and store information of an optional file system.

The host may be a display device.

The interface may provide the host with physical device information allowed by the host.

The interface may change an intrinsic command set of the optical disc drive to a command set accepted by the host.

The intrinsic file system of the optical medium is one of a file allocation table (FAT) file system, a compact disc file system (CDFS), and a universal disc format (UDF) file system.

The interface may use a universal serial bus (USB) protocol.

The host may be one of a PC and a TV receiver set. The interface may be configured to determine whether the host is the PC or the TV receiver set during an operation of recognizing a USB protocol between the PC and the TV receiver set.

The interface may use a wireless protocol.

The optical file system may be a FAT file system.

In another aspect, there is provided a method of driving an optical disc drive, the method includes converting information of a file system of an intrinsic format of an optical disc mounted in the optical disc drive into information of an optional file system, and transmitting the converted information of the optical file system to a host connected to the optical disc drive.

The method may further include storing all information of the optical disc loaded onto the optical disc drive in a first buffer memory. The converting of information may include converting the information of the file system into the information of the optional file system using file information stored in the first buffer memory.

The optical file system may be a FAT file system.

The converting of information may include storing the information of the optional file system in a second buffer memory. The transmitting of the converted information may include transmitting of the information of the optional file system stored in the second buffer memory to the host.

The optical disc drive may provide the host with physical device information allowed by the host.

An intrinsic command set of the optical disc drive may be changed to a command set accepted by the host.

The intrinsic file system of the optical medium may be one of a FAT file system, a CDFS, and a UDF file system.

The optical disc drive may communicate information with the host using a USB protocol.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Optical discs may include most or all types of general media in which information is physically recorded. The optical discs may include CDs, DVDs (DVD-Rs, DVD-RWs, DVD+Rs, DVD+RWs, and DVD-RAMS), BDs, 3Ds, and hologram (near-field light), and have their intrinsic file systems. General file systems of the optical discs may include a compact disc file system (CDFS), a universal disc format (UDF) file system, and a file allocation table (FAT) file system. The optical discs may be mounted in optical disc drives having interfaces connected to a host such as a TV receiver set. Although the optical discs may be independently driven, since their intrinsic functions may be implemented according to the optical disc drives, the optical discs may be elements of the optical disc drives.

Figure 1:
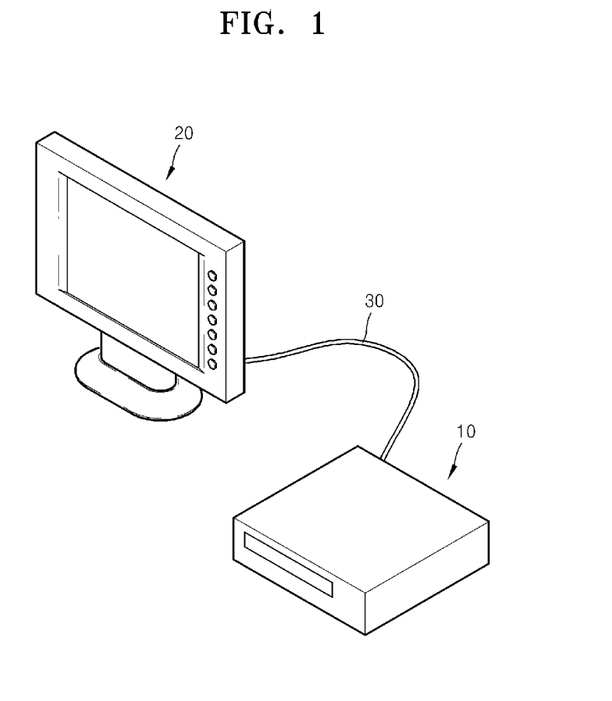
FIG. 1 illustrates an example of an optical disc drive connected to a TV receiver set.

FIG. 1 illustrates an example of an optical disc drive 10 connected to a TV receiver set 20.

Referring to the example in FIG. 1, the optical disc drive 10 is a slave device (a peripheral device) of a host, such as the TV receiver set 20, and is connected to the TV receiver set 20 via an inter-cable 30.

Information may be communicated between interfaces of the optical disc drive 10 and the TV receiver set 20 via the inter-cable 30. The interfaces may typically each include a 1.0, 1.1, 2.0, or 3.0 version universal serial bus (USB) port, for example. That is, a USB cable may be used as the inter-cable 30, and thus the optical disc drive 10 and the TV receiver set 20 may communicate information using an USB protocol. Meanwhile, in another example, the interfaces may be configured using a wireless method without the inter-cable 30. The wireless method may include various types of well-known methods including a wireless electric wave connection method such as Bluetooth or wireless LAN (such as Wi-Fi) or a wireless optical connection method using infrared rays, etc.

A host that may be connected to an external slave device, such as the TV receiver set 20 or an electronic picture frame, for example, supports limited file systems. A typical file system is a FAT file system, which may be applied to various types of memory cards such as CompactFlash (CF), Secure Digital (SD), MultimediaCard (MMC), Memory Stick, etc., and hard disc drives (HDDs) as well. Although there are various file systems other than a FAT file system, a host may not support all file systems and support only a widely used file system. The TV receiver set 20, as a host, may receive cable broadcasting, Internet broadcasting, and terrestrial broadcasting and includes a system for reproducing content such as multimedia. The content to be reproduced may be obtained from an externally connected slave device. However, for example, the TV receiver set 20, which supports a FAT file system, cannot receive content from an optical medium device having a CDFS or UDF file system.

The examples described below relate to a method and apparatus for securing a connectivity of an optical disc drive to a host, for example, a TV receiver set, that supports a file system among limited files systems, for example, a FAT file system, by converting an intrinsic file system of the optical disc drive into a file system supported by the TV receiver set, such as the FAT file system, and sending the converted file system. The TV receiver set that supports the FAT file system is an example of display devices, and the display device is not limited thereto. Various display devices may include, for example, an electronic picture frame.

Figure 2:
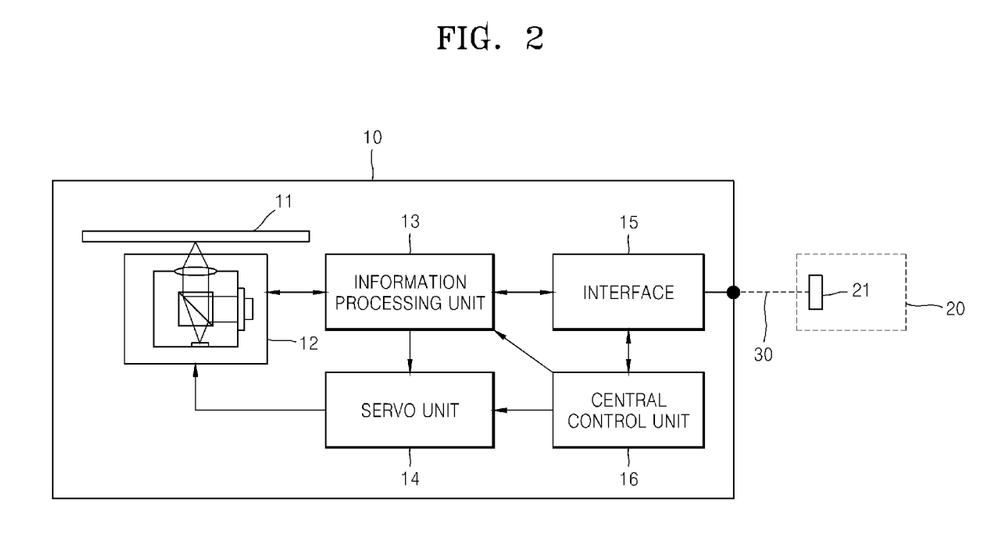
FIG. 2 is a diagram illustrating an example of the optical disc drive of FIG. 1.

FIG. 2 illustrates an example of the optical disc drive 10. Referring to FIG. 2, the optical disc drive 10 includes an optical pickup 12 for reading information from an optical disc 11 or recording information therein. The optical pickup 12 includes an optical system including an objective lens, a laser diode (LD), an optical detector, etc., included in a general optical structure, and a mechanical system for mechanically supporting the optical system and performs focusing and tracking operations. The optical system includes an encoder/decoder, is connected to an information processing unit 13 connected to an interface 15 used to connect the optical disc drive 10 to an external host. The mechanical system is connected to a servo unit 14. The information processing unit 13, the servo unit 14, and the interface 15 are controlled by a central control unit 16.

The interface 15 may include a USB port, for example, through which the interface 15 communicates information with the TV receiver set 20, that is, the external host, using a USB protocol. The TV receiver set 20 may reproduce content provided from the optical disc drive 10 using a content producing device embedded in the TV receiver set 20. To provide the TV receiver set 20 with the content, the optical disc drive 10 and the TV receiver set 20 communicate information via the interface 15 of the optical disc drive 10 and an interface 21 of the TV receiver set 20, respectively. The TV receiver set 20 may be recognized as a device for accommodating the optical disc drive 10 and receives recognizable file system information from the optical disc drive 10. When a host, for example, the TV receiver set 20, and a device connected thereto, for example, the optical disc drive 10, can use a compatible command set and a file system, the device for accommodating the optical disc drive 10 may be referred to as a device recognizable and accessible by the TV receiver set 20. A device that cannot be accessed by the host may be defined as an unknown device and is unable to communicate information with the host. Thus, when the optical disc drive 10 is connected to a host, the optical disc drive 10 may transmit information in response to an inquiry (request) command from the host. If the optical disc drive 10 is incompatible with the host, the optical disc drive 10 may transmit a code regarding information of a command set used by a block device compatible with the host, such as a HDD, which is a widely compatible and similar medium. As listed in Table 1 below, optical discs such as a CD, a DVD, etc. may be defined as a code 05h of a peripheral device that uses an MMC command set. When the host does not accept the MMC command set, the code 05h can be converted into a code 00h of a direct access block device, for example, a magnetic disc drive, that uses an acceptable command set, for example, a most general small computer system interface block commands (SBC) command set. Such a conversion may be performed by a converting unit embedded in an interface.

TABLE 1

| Code | Reference | Description |
|---|---|---|
| 00h | SBC | Direct-access block device (e.g., magnetic disk) |
| 01h | SSC | Sequential-access device (e.g., magnetic tape) |
| 02h | SSC | Printer device |
| 03h | SPC | Processor device |
| 04h | SBC | Write-once device (e.g., some optical disks) |
| 05h | MMC | Multi-Media logical unit (e.g., CD-ROM/-R/-RW, DVD-ROM/-RAM/-R/-RW, DVD+R/+RW, HD DVD-ROM/-R/-RAM, BD-ROM/-R/-RE) |
| 06h | — | Scanner device (obsolete) |
| 07h | SBC | Optical memory device (e.g., some optical disks) |
| 08h | SMC | Medium changer device (e.g., jukebox) |
| 09h | — | Communications device (obsolete) |
| 0Ah-0Bh | — | Obsolete |
| 0Ch | SCC | Storage array controller device (e.g., RAID) |
| 0Dh | SES | Enclosure services device |
| 0Eh | RBC | Simplified direct-access device (e.g., magnetic disk) |
| 0Fh | OCRW | Optical card reader/writer device |
| 10h | BCC | Bridge Controller Commands |
| 11h | OSD | Object-based Storage device |
| 12h | ADC | Automation/Drive Interface |
| 13h-1Eh | — | Reserved |
| 1Fh | — | Unknown or no logical unit type |

Table 2 below shows command set information as a subclass code of a USB device.

TABLE 2

| SubClass Code | Command Block Specification | Comment |
|---|---|---|
| 00h | SCSI command set not reported | De facto use |
| 01h | Reduced Block Commands (RBC) T10 Project 1240-D | Defined outside of USB |
| 02h | MMC-5 (ATAPI) | Defined outside of USB |
| 03h | Obsolete | Was SFF-8070i |
| 04h | USB Floppy Interface (UFI) | Specifies how to interface Floppy Disk Drives to USB. |
| 05h | Obsolete | Was QIC-157 |
| 06h | SCSI transparent command set | Defined outside of USB |
| 07h | Lockable Mass Storage | LSDFS specifies how host has to negotiate access before trying SCSI. |
| 08h | IEEE 1667 | Defined outside of USB |
| 09h-FEh | Reserved | Reserved |
| FFh | Specific to device vendor | De facto use |

According to the USB specification, the optical disc drive 10 may have a device class code 08H in an interface descriptor and thus belonging to a mass storage device, and has a subclass code 02h and thus using an MMC-5 (AT attachment packet interface (ATAPI)) command set.

However, when a device of a subclass code 02h, which applies the MMC command set, e.g., the optical disc drive 10, is recognized as a device that is not supported by the host, since it may be impossible for the host to use the subclass 02h, a subclass code that is recognized by the host, for example, a subclass code 06h, which uses the most general SBC, is transmitted to the host, so that the host may recognize the optical disc drive 10 as a useable device. However, when the device of the subclass 02h is recognized as a device that is supported by the host, the subclass 02h is transmitted to the host.

After the optical disc drive 10 is recognized by the host by using the above-described method, when the host requests directory entry information, the optical disc drive 10 may convert information of a file system having a format intrinsic to an optical disc to information of a FAT file system having a format recognizable by the host, and transmit the converted information of the FAT file system to the host. That is, although the optical disc drive 10 may include information of a file system having a CDFS or UDF format, the optical disc drive 10 converts the information of the file system having the CDFS or UDF format into information of the file system having a FAT format. Such a conversion may be performed by a converting unit embedded in an interface. Meanwhile, examples of FAT formats include a FAT16 format of 16 bits, a FAT32 format of 32 bits, and an exFAT format of 64 bits.

Therefore, the host may recognize file information including an address of content stored in an optical disc and thus may access and reproduce specific content.

Figure 3:
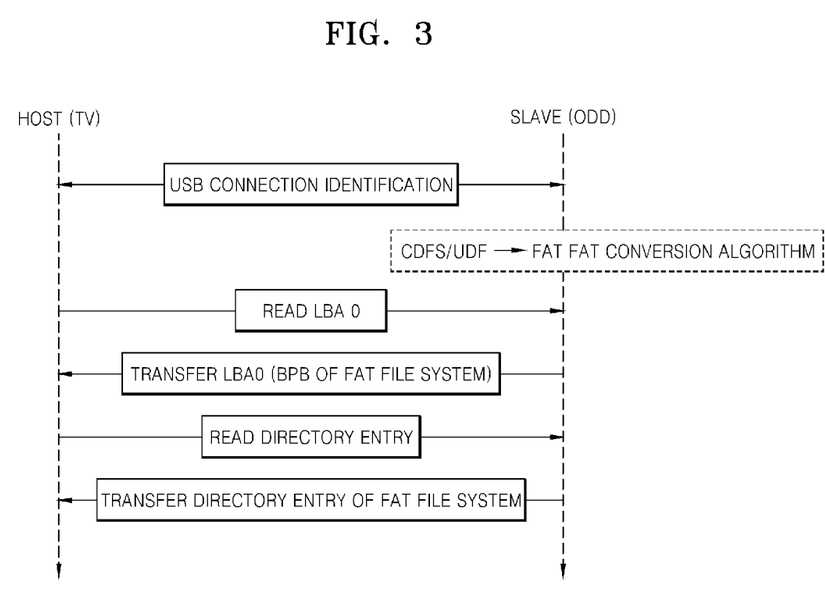
FIG. 3 is a diagram illustrating an example of a connection between a host, such as a TV receiver set, and a slave via a USB interface.

FIG. 3 illustrates an example of a connection between a host (TV), such as a TV receiver set, and a slave (ODD) via a USB interface.

Referring to FIG. 3, the host TV and the slave ODD identify themselves to each other before communicating information via the USB interface. The host (TV) requests information such as a master boot record (MBR) stored in a first logical block address (LBA) 0. In response, the slave (ODD) transmits a boot sector and a basic input/output system (BIOS) parameter block (BPB) having a FAT format to the host (TV). If the host (TV) requests a directory entry, the slave (ODD) transmits information of the directory entry having the FAT format to the host (TV). The host (TV), after having obtained the information of the directory entry, may be informed of a location (address) of data (content) of the slave (ODD) and thus the host (TV) may read and reproduce the data using the address. Although the MBR, the BPB, and the information of the directory entry transmitted from the slave (ODD) to the host (TV) originally have a CDFS/UDF format, the CDFS/UDF format may be converted into the FAT format by an internal converting unit.

Table 3 below shows a FAT conversion program function, MakeFat, as pseudocode of an algorithm for converting a CDFS/UDF format into a FAT format.

TABLE 3

FAT conversion function /sector size = 512
Function MakeFat
   PASS IN : Integer of fat_offset
   PASSOUT : nothing (void)
   CALCULATE cur_tbl_start as 512*fat_offset
   CALL ClearFATT with sector_size
   WHILE infinite
     CALL ReadFATB with clus_start_index RETURING clus_start
     CALL ReadFATB with clus_end_index RETURING clus_end
     IF clus_start is equal to end of entry mark THEN
       QUIT function
     ENDIF
     IF cur_tbl_start?clus_start&&cur_tbl_start<=clus_end THEN
       SET buf_idx to 0
       SET clus_idx_s to cur_tbl_start
     ELSEIF cur_tbl_start<=clus_start &&
     (cur_tbl_start+512)>clus_start THEN
       CALCULATE buf_idx as (clus_start−cur_tbl_start)*4
       SET clus_idx_s to clus_start
     ELSE
       SET buf_idx to −1
     END IF TABLE 3-continued

```
    IF buf_idx is equal to −1 THEN
        QUIT function
    END IF
    REPEAT
        INCREMENT clus_idx_s
        IF clus_idx_s>clus_end THEN
            SET clus_idx_s to FAT32_LAST CLUSTER_MARK
        ENDIF
        CALL WriteFATT with buf_idx and clus_idx_s
        INCREMENT buf_idx
    UNTIL cur_tbl_start+512 > clus_idx_s
    END WHILE
END FUNCTION
```

In the above pseudocode, clus_start_index and clus_end_index indicate a start index of a cluster and an end index thereof, respectively. Such an algorithm is used when the host (TV) requests a FAT. The FAT is generated by receiving a FAT offset as a factor or a parameter, and systematizing a FAT entry corresponding to the FAT offset in a FATT buffer using file information stored in a FATB buffer.

Figure 4:
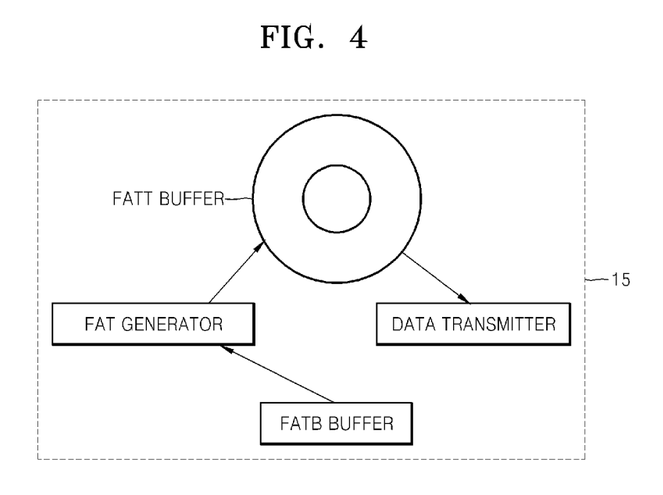
FIG. 4 is a diagram illustrating an example of a file system converting unit.

FIG. 4 illustrates an example of a file system converting. Referring to FIG. 4, a FATT buffer is a ring buffer type, is an element of the file system converting unit, and uses an allocated area of a random access memory (RAM) embedded therein. When an optical disc is loaded onto an optical disc drive, a FATB buffer (a first buffer memory) may store a start location, an end location, and a type of a file stored in the optical disc, and may be used as raw data during a FAT conversion according to the pseudocode shown in the example of FIG. 4. The FATT buffer (a second buffer memory) uses an allocated area of the random access memory (RAM), systematizes a FAT entry using the file information stored in the FATB buffer, and stores the FAT entry therein. A FAT generator generates a FAT from an offset requested from a host using the file information stored in the FATB buffer, and stores the FAT in the FATT buffer. Data stored in the FATT buffer is transmitted to the host via a data transmitter embedded in an interface. According to the example described by the above-mentioned structure, operations for generating and transmitting the FAT are performed in parallel in independent blocks, thereby increasing efficiency in the generation and transmission of the FAT.

Figure 5:
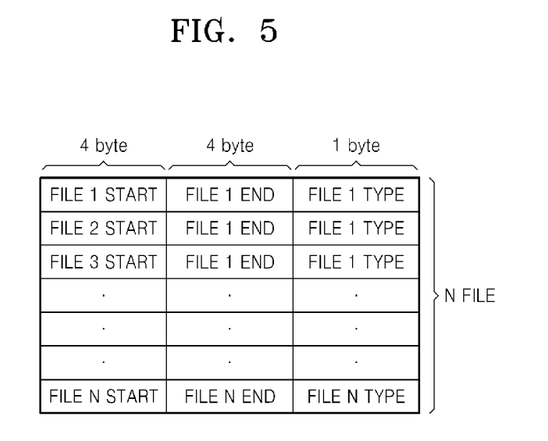
FIG. 5 is a table illustrating an example of a logical structure of a buffer memory for storing file information obtained from an optical disc used for a file system converting unit.

FIG. 5 illustrates an example of a logical structure of a FATB buffer for storing information regarding N files (N is a natural number). Referring to FIG. 5, if an optical disc drive onto which an optical disc is loaded is driven or if a new optical disc is loaded onto the optical disc drive, a file system converting unit retrieves all files of the optical disc and records start locations (4 bytes), end locations (4 bytes), and types (1 byte) of the files into the FATB buffer. For reference, in a UDF or ISO-9660 file system, since file data is seamlessly stored consecutively in a single area, start and end locations of files make it possible to read all data of the files.

Figure 6:
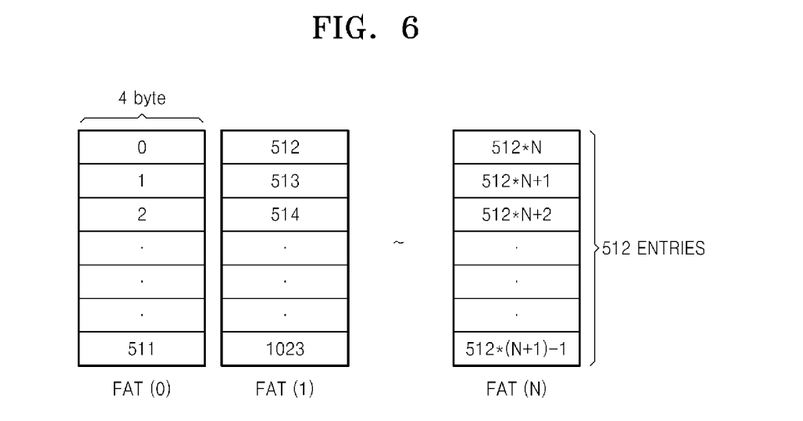
FIG. 6 is a table illustrating an example of a logical structure of a file allocation table (FAT).
Figure 7:
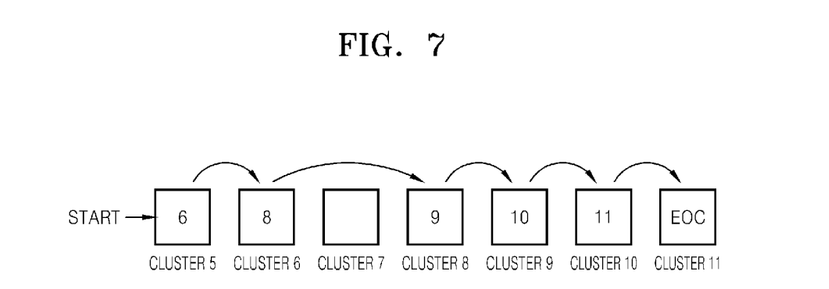
FIG. 7 is a diagram illustrating an example of a structure of a discontinuous cluster chain in a FAT system.

FIG. 6 illustrates an example of a logical structure of a FAT. Referring to FIG. 6, a FAT 32 file system has sectors of 2048 bytes and FAT entries of 4 bytes. File data may be stored in a FAT file system in a discontinuous cluster chain manner as shown in FIG. 7. Thus, FAT information shown in, for example, FIG. 6 may be utilized to understand a location of the file. That is, if file data is stored in the order of clusters 513, 515, 516, and 600, the cluster 515 is recorded in the cluster 513, the cluster 516 is recorded in the cluster 515, and an end of cluster (EOC) is recorded in the cluster 600, so that the file data may be read.

Figure 8:
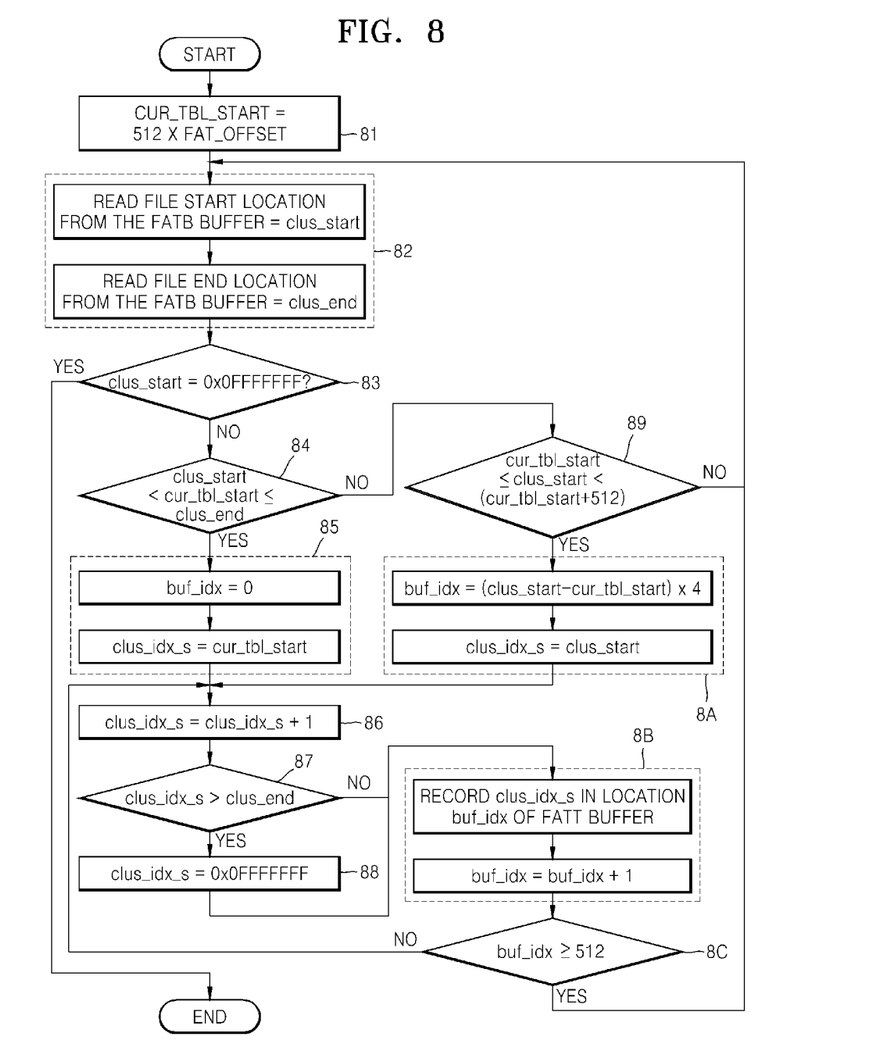
FIG. 8 is a flowchart illustrating an example of a FAT generation algorithm.

FIG. 8 illustrates an example of a method of generating a FAT using the above-mentioned algorithm. As described above, a fat_offset value is received as a parameter, 512, that is, a sector size, is multiplied to the fat_offset value, and a value obtained from the multiplication is inserted into an instance variable cur_tbl_start (operation 81). In general, since data may be continuously stored in a FAT by a predetermined size from an LBA 32 of an optical disc, the data may be transmitted from the FAT to a host by reading a corresponding file address in response to a request of the host. However, when a FAT is not previously stored and is generated in real time, a FAT in accordance with a requested address may be generated and transmitted to the host. An offset is determined in view of a start location of the FAT. When the FAT starts from a LBA 32, if the host requests data of the LBA 32, the fat_offset value is 0, and if the host requests data of a LBA 33, the fat_offset value is 1. Since the size of a current single cluster is 2048 bytes, and an address representing a cluster number is 4 bytes, the instance variable cur_tbl_start (a start address of cluster) is calculated by multiplying 512 to the fat_offset value. That is, the instance variable cur_tbl_start indicates a first cluster number among a FAT entry of the requested address.

Start and end locations clus_start and clus_end are established by reading data corresponding to start locations and end locations of files from a FATB buffer (operation 82). The FATB buffer stores start locations and end locations of all files on a disc as described above, reads a start location and an end location of a next file whenever repeating loops, and stores the start location and the end location of the next file in the start and end locations clus_start and clus_end in 4 byte units. While loops are repeated (operation 83), if the start location clus_start has a value of 0x0FFFFFFF (operation 84), it is determined that there is no more file information, and the method of generating the FAT ends.

In this example, generating of the FAT may refer to recording of FAT entries in a FATT buffer. As described above, since the size of a single FAT entry (a cluster number) is 4 bytes, the FATT buffer having 2048 bytes can express 512 FAT entries. In order to transmit the FAT required by the host, the start location clus_start and the end location clus_end of files read from the FATB buffer are compared with the instance variable cur_tbl_start. If the instance variable cur_tbl_start is greater than the start location clus_start and is smaller than or the same as the end location clus_end, this process proceeds to operation 85. If not, this process proceeds to operation 89.

In operation 85, an instance variable buf_idx for storing a buffer index used to determine a recording location in the FATT buffer greater than the start location of the file is set (cleared) as 0, and (a cluster number that is to be recorded in the corresponding instance variable buf_idx) (the instance variable cur_tbl_start) is stored in an instance variable clus_idx_s, that is, a temporary counter. A value of 1 is added to the instance variable clus_idx_s until the instance variable clus_idx_s is greater than the end location clus_end (operation 86), then if the instance variable clus_idx_s is greater than the end location clus_end (operation 87), 0x0FFFFFFF indicating a final cluster chain is inserted into the instance variable clus_idx_s (operation 88). Next, the instance variable clus_idx_s is recorded in the instance variable buf_idx of the FATT buffer, and a value of the instance variable buf_idx is increased by 1 (operation 8B). The operation of establishing the instance variable clus_idx_s and recording the instance variable clus_idx_s in the instance variable buf_idx of the FATT buffer is repeated until the instance variable buf_idx is greater than 512 (operation 8C). That is, if the instance variable buf_idx is smaller than 512 after operation 8B is performed, this process returns to operation 82. If not, this process proceeds to operation 86.

Meanwhile, since the instance variable cur_tbl_start is a start cluster number of the FAT corresponding to the requested fat_offset in operation 89, if the start location clus_start is the same as or greater than the instance variable cur_tbl_start, and is smaller than the instance variable cur_tbl_start+sector size (512), the start location clus_start is included in the FAT of the requested fat_offset, and this process proceeds to operation 8A. In operation 8A, a first recording location of the FATT buffer is determined by substituting (the start location clus_start-the instance variable cur_tbl_start)*4 for the instance variable buf_idx, and a first recording value of buf_idx is determined by substituting clus_start for clus_idx_s, and then this process proceeds to operation 86.

An operation of recognizing and operating a typical FAT file system is described in the present example. Conversion of a CDFS/UDF format into a FAT format is performed by a converting unit in real time according to a request of a host.

Figure 9A:
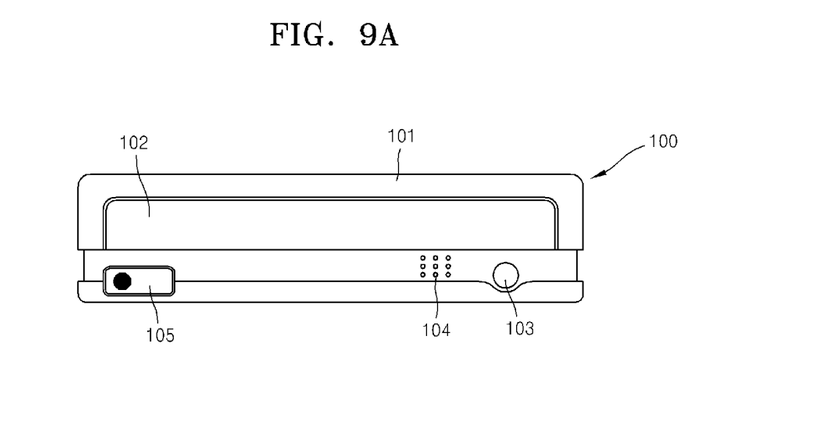
FIGS. 9A and 9B are front and rear views, respectively, of an example of an optical disc drive.
Figure 9B:
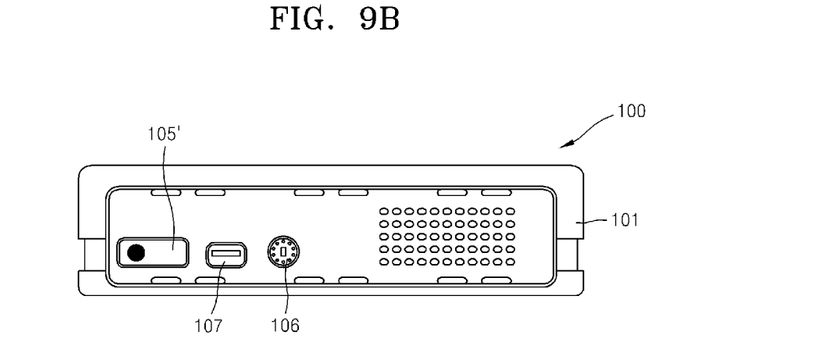

FIGS. 9A and 9B are front and rear views, respectively, of examples of an optical disc drive 100. Referring to FIGS. 9A and 9B, host select switches 105 and 105' are used to connect the optical disc drive 100 to a host, for example, a TV receiver set, that may be incompatible with an intrinsic file system of the optical disc drive 100, such as a CDFS/UDF format, as described above, and to a PC that supports the intrinsic file system format of the optical disc drive 100. The host select switches 105 and 105' are connected to an internal circuit of the optical disc drive 100 and select whether to convert device information and convert and transmit a file system according to the method described above.

The optical disc drive 100 includes a main body 101, an optical disc tray 102, a tray opening/closing button 103, an operation state display lamp 104, a power terminal 106, and an interface terminal 107, for example, a USB terminal. The optical disc drive 100 includes the host select switch 105 installed on the front surface thereof and the host select switch 105' installed on the rear surface thereof.

Figure 10:
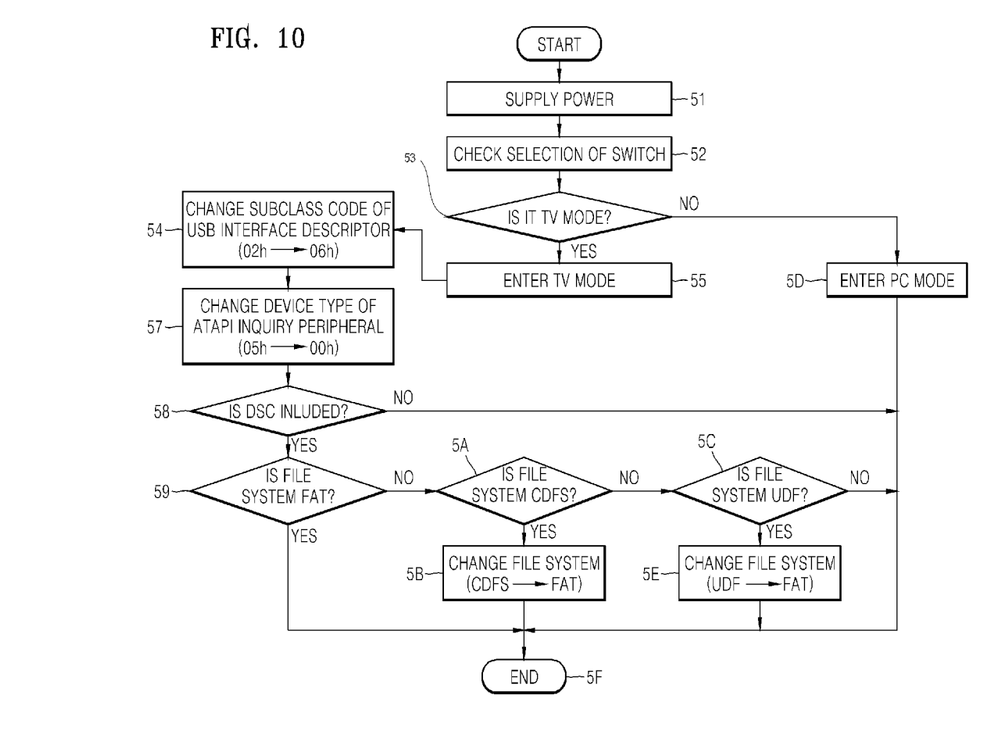
FIG. 10 is a flowchart illustrating an example of a method of reproducing content of an optical disc employing file systems of three types of formats using a TV receiver set, as a host, supporting a file system of a FAT format.

FIG. 10 illustrates an example of a method of reproducing (accessing) content of an optical disc employing file systems of three type of formats (FAT, CDFS, and UDF) using a TV receiver set, as a host, supporting a file system of a FAT format.

Referring to FIG. 10, if an optical disc drive is turned on when connected to the host (operation 51), the optical disc drive internally determines states of the host select switches 105 and 105' (operation 52). If the states of the host select switches 105 and 105' are not determined to be a TV mode (operation 53), the states of the host select switches 105 and 105' are determined to be a general-purpose PC mode, and thus the optical disc drive enters a PC mode (operation 5D). If the states of the host select switches 105 and 105' are determined to be the TV mode, the optical disc drive enters the TV mode (operation 55).

If the optical disc drive includes an external switch as described above, the external switch may be used to determine the TV mode or the PC mode. If the optical disc drive includes no external switch, the TV mode or PC mode may be determined using a software method of utilizing the above feature in which a TV and a PC recognize a USB unit in different ways.

In a first operation of the TV mode, a subclass 02h of a USB interface descriptor is changed to a subclass 06h allowed by the TV (operation 54).

Thereafter, a device type is changed to have a command set accepted by the TV. For example, 05h (multimedia logical unit) using an MMC command set is changed to 00h (direct access block device, e.g., magnetic disc) using an SBC command set (operation 57).

It is determined whether a disc tray includes an optical disc (operation 58). If it is determined that the disc tray includes an optical disc, this process proceeds to a next file system examining operation. If not, this process ends. A file system converting unit retrieves all files of the optical disc and then stores start locations, end locations, and types of all files in a FATB buffer as described above. For reference, in a UDF or ISO-9660 file system, since file data is seamlessly stored consecutively in a single area, start and end locations of files make it possible to read all data of the files.

In a first file system checking operation, it is determined whether the optical disc has the file system of the FAT format (operation 59). For example, a DVD-RAM can be formatted in a file system of the UDF or FAT format. If the optical disc is FAT formatted, since the FAT format is supported by the TV, this process ends (operation 5F). If the optical disc is not FAT formatted, it is determined whether the optical disc has the file system of the CDFS format (operation 5A). If the optical disc is CDFS formatted, a file system of the optical disc is changed from the CDFS format to the FAT format to respond to an inquiry of the host (operation 5B). If the optical disc is not CDFS formatted, it is determined whether the optical disc has the file system of the UDF format (operation 5C). If the optical disc is UDF formatted, the UDF file system is changed to a FAT file system to respond to the inquiry of the host (operation 5E).

The host obtains information of the FAT file system including directory entries, a FAT, etc., from the optical disc drive through the above process, and uploads and reproduces content from the optical disc drive.

In the examples above, an optical disc drive and a method of driving the optical disc drive may be used when access of an optical disc drive is not allowed or, when it is allowed, an intrinsic file system of the optical disc drive is not supported. That is, when the optical disc drive is incompatible with a specific host of various hosts, for example, a TV receiver set, device information compatible with the host and a function and operation for converting a file system of the optical disc drive into, for example, a FAT system, are provided to the optical disc drive and the method of driving the optical disc drive, thereby increasing the range of its utility.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The desired hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if different components in a described system, architecture, device, or circuit are combined in a different manner and/or replaced or supplemented by other components or their equivalents. Accordingly, other implementations are within the scope of the following claims.

What is claimed is:

1. An apparatus comprising:
  a processor configured to process information;
  a memory for storing a file system to organize files; and
  an interface to connect the processor to a host disposed external to the apparatus the interface configured to:
    convert an intrinsic command set of the apparatus to a command set indicated as being acceptable by the host based on a determination by the apparatus of whether the intrinsic command set of the apparatus is compatible with a communication protocol of the host;
    convert information of the file system of the memory into information of a different file system determined compatible with the host, in response to a receiving of a directory entry information request from the host; and
    transmit the converted information to the host using the converted intrinsic command set.

2. The apparatus of claim 1, wherein the interface comprises:
  a buffer memory configured to
    temporarily store file information of the file system of the memory, and
    store information of the different file system determined compatible with the host.

3. The apparatus of claim 1, wherein the host comprises a display device.

4. The apparatus of claim 1, wherein the interface is further configured to provide the host with physical device information determined to be compatible with the host.

5. The apparatus of claim 1, wherein the file system of the memory is any one or any combination of a file allocation table (FAT) file system, a compact disc file system (CDFS), and a universal disc format (UDF) file system.

6. The apparatus of claim 1, wherein the interface is further configured to use a universal serial bus (USB) protocol.

7. The apparatus of claim 1, wherein:
  the host comprises one of a PC and a TV receiver set; and
  the interface is further configured to determine whether the host comprises the PC or the TV receiver set, during an operation of recognizing a USB protocol between the PC and the TV receiver set.

8. The apparatus of claim 1, wherein the interface is further configured to use a wireless protocol.

9. The apparatus of claim 1, wherein the different file system determined compatible with the host a FAT file system.

10. A method of operating an apparatus, the method comprising:
  receiving, by the apparatus, a request from a host disposed external to the apparatus;
  selectively converting, by the apparatus, an intrinsic command set of the apparatus to a command set indicated as being acceptable by the host, and information of the file system stored in a memory of the apparatus into information of a different file system determined compatible with the host, based on a determination by the apparatus of whether the intrinsic command set of the apparatus is compatible with a communication protocol of the host; and
  transmitting to the host one of the converted information using the converted intrinsic command set and the information of the file system of the memory using the intrinsic command set.

11. The method of claim 10, further comprising:
  storing all information of the memory in a first buffer memory of an interface of the apparatus,
  wherein, in the converting of the information of the file system stored in the memory into the information of the different file system, the information of the file system stored the memory is read from the first buffer memory.

12. The method of claim 10, wherein the different file system determined compatible with the host is a FAT file system.

13. The method of claim 10, wherein the converting of information of the file system stored in the memory comprises:
  storing the converted information in a second buffer memory of an interface of the apparatus,
  wherein the transmitting of the converted information comprises transmitting the stored converted information from the second buffer memory to the host.

14. The method of claim 10, wherein the apparatus provides the host with physical device information determined by the apparatus to be compatible with the host.

15. The method of claim 10, wherein the file system stored in the memory is any one or any combination of a file allocation table (FAT) file system, a compact disc file system (CDFS), and a universal disc format (UDF) file system.

16. The method of claim 10, wherein the apparatus communicates information with the host through an interface using a USB protocol.

17. The apparatus of claim 1, wherein the memory is an optical medium, and the information of the file system stored in the memory includes information to track files stored on the optical medium.

18. The apparatus of claim 1, wherein the interface configured to convert a compact disc file system (CDFS) or a universal disc format (UDF) file system to a file allocation table (FAT) file system to transmit to the host.

19. An apparatus comprising:
  an interface unit configured to
    connect a device to a host disposed external to the device,
    transmit an inquiry request from the host to the device,
    determine whether an intrinsic command set of the device is compatible with a communication protocol of the host,
    receive information of a file system of a memory of the device,
    selectively convert the received information of the file system of the memory into a different file system format determined compatible with the host, and
    transmit, in response to the inquiry request, one of the converted information of the file system of the memory using a command set that is determined compatible with the host and the received information of the file system of the memory using the intrinsic command set of the device.

20. The apparatus of claim 19, wherein the interface unit is configured to respectively store the received information of the file system of the memory and interface unit, the buffer memory being configured to temporarily store file system information of different file system formats.

21. A non-transitory computer-readable storage medium having stored therein program instructions to cause at least one processing device to implement the method of claim 10.

22. The apparatus of claim 1, wherein the interface is further configured to determine an offset value indicating a location of an optional file system, and convert the information of the file system of the memory, in an optical medium format, into the information of the different file system determined compatible with the host based on the offset value indicating the location of the optional file system.

23. The apparatus of claim 1, wherein the interface connects the processor to the host by performing the conversion of the intrinsic command set, the conversion of the information of the file system of the memory, and the transmission of the converted information based on an inquiry request from the host indicating that the intrinsic command set of the apparatus is not compatible with the host; and wherein the interface connects the processor to the host by transmitting the information of the file system of the memory from the apparatus to the host using the intrinsic command set based on the inquiry request from the host indicating that the intrinsic command set of the apparatus is compatible with the host.

24. The apparatus of claim 1, wherein the apparatus is an optical drive, the memory is an optical medium, and the file system of the memory is an intrinsic optical medium format file system.

25. The method of claim 10, wherein the transmitting to the host is performed in response to a receipt by the apparatus of the request from the host, and the one of the converted information and the information of the file system of the memory is transmitted based on the determination of whether the intrinsic command set of the apparatus is compatible with the communication protocol of the host.

* * * * *